United States Patent [19]

Furness et al.

[11] 4,059,794
[45] Nov. 22, 1977

[54] METHOD AND APPARATUS FOR MONITORING PASS ALIGNMENT IN ROLLING MILLS

[75] Inventors: Bernard J. Furness; John R. Cousins; Dennis Tuft, all of Rotherham, England

[73] Assignee: British Steel Corporation, London, England

[21] Appl. No.: 593,389

[22] Filed: July 7, 1975

[30] Foreign Application Priority Data

July 15, 1974 United Kingdom ............... 31276/74

[51] Int. Cl.² ........................................... G01R 33/12
[52] U.S. Cl. ..................................... 324/208; 33/182; 33/286; 72/21; 72/35; 72/247; 324/227; 324/232; 324/236
[58] Field of Search .............. 324/34 R, 34 D, 34 PS, 324/34 TK, 37, 40; 72/8, 21, 31, 35, 247; 33/182, 286

[56] References Cited

U.S. PATENT DOCUMENTS

| 3,077,800 | 2/1963 | Taylor | 71/21 |
| 3,375,688 | 4/1968 | Taylor | 72/21 |
| 3,502,968 | 3/1970 | Tobin, Jr. et al. | 324/40 |
| 3,570,288 | 3/1971 | Fischer et al. | 72/21 |
| 3,609,527 | 9/1971 | Ellis | 324/40 |
| 3,850,015 | 11/1974 | Andresen | 324/34 TK |

FOREIGN PATENT DOCUMENTS

| 1,479,280 | 5/1967 | France | 324/34 R |
| 2,076,825 | 1/1970 | France | 324/34 R |
| 666,127 | 2/1952 | United Kingdom | |
| 1,162,671 | 8/1969 | United Kingdom | |
| 1,262,664 | 2/1972 | United Kingdom | |

Primary Examiner—Robert J. Corcoran
Attorney, Agent, or Firm—Bacon & Thomas

[57] ABSTRACT

A method of, and apparatus for, monitoring the alignment of a pass defined between cooperating rolls in a mill stand during rolling bar, rod or section stock. Measurement is effected through eddy current sensors which are mounted in close proximity to the ends of the rolls and provide an output indicative of the amount by which they are spaced from the roll surface. In some instances other parameters e.g. roll wear, are also measured by similar eddy current sensors appropriately located in close proximity to the roll surfaces.

11 Claims, 5 Drawing Figures

METHOD AND APPARATUS FOR MONITORING PASS ALIGNMENT IN ROLLING MILLS

This invention relates to a method of, and apparatus for, measuring a parameter of co-operating rolls in a mill stand, e.g. relative roll displacement along the axes thereof in a rod bar or section mill, roll wear, roll deflection, roll surface roughness etc.

In its broadcast aspect the present invention provides a method of monitoring the alignment at a pass defined between co-operating rolls in a mill stand during rolling bar, rod or section stock in which a plurality of eddy-current sensors are fixedly mounted in close proximity to the end surfaces of the work rolls and provide outputs representative of the amount by which they are spaced from the said surfaces whereby to monitor any change in the disposition of the said rolls along their axes from a datum position defining a perfectly aligned pass.

The sensors may, for example, be located adjacent the end surfaces proper of the work rolls, i.e. at the end of the roll necks, or adjacent the roll shoulders, in a bar/rod mill rolling rounds, hexagons or squares or a section mill so as to be responsive to any change in the disposition of the rolls along their axes such as those changes caused by axial thrusts generated as the stock passes through the grooved roll 'pass' or any forces generated by the drive shafts. The output from the sensors can then be utilized for correcting this misalignment.

Alternatively, or additionally, the sensors may be mounted in planes containing the roll axes and lying parallel to the direction of travel of the stock so as to measure roll wear over a period of time. Roll deflection (bending) may also be detected by providing, in conjunction with the wear sensors, a number of sensors in a plane normal to the direction of stock travel and containing the axes of the rolls or as near to this axial plane as is possible where back-up rolls are provided. The wear and the position of rolls may also be detected in complex section mills, such as those for rolling beams etc., stock height may also be measured and since eddy-current sensors are employed even surface roughness may be measured since this parameter affects the path traversed by the current.

The outputs obtained from the sensors are processed in a manner dependent on the measured parameter.

More particularly, the eddy-current sensors are energised by a high frequency oscillator, the outputs from which are demodulated and applied through a function switch to an appropriate display unit which may be of digital or analogue form or incorporate some form of warning device. The function switch operates to select the absolute spacing or distance between each sensor and its associated roll, or the difference between these distances depending on the particular parameters being measured. Alternatively, a comparison may be made between the absolute distance and a reference 'datum' distance in order to measure roll wear, for example. Since the output voltage from this circuitry is almost exactly proportional to the logarithm of the distance, the output is fed to a log ratio amplifier before application to a display unit; in this manner the distance is displayed as a linear function, at least for distances for up to, say, 2.5 mm. Also envisaged where space for the sensors permits are larger sizes of sensor, measuring correspondingly greater clearances.

As mentioned, provision may also be made for surface roughness or defects to be measured; the circuitry for this may conveniently be of the form disclosed in co-pending U.S. patent application Ser. No. 590,194, filed June 25, 1975, now U.S. Pat. No. 3,974,442, taken from the the oscillator.

In accordance with this invention therefore, various roll parameters may be measured. The use of eddy-current sensors is particularly suited to the rolling mill environment since in general it is unaffected by the presence of water or other lubricants and is robust yet small and reliable. The provision of continuous measurements avoids the mill down-time which would otherwise ensue in making these measurements physically. The possibility of premature roll changes is similarly avoided by this continuous measurement and a significant reduction may readily be obtained in the reject material rolled by defective or misaligned rolls since remedial action may be taken immediately. This is particularly important where roll misalignment is concerned since the rolling of initial trial bars becomes practically unnecessary whereas hitherto trial bar rolling and subsequent inspection has been essential in order to effect correction.

Measurement of roll bending avoids the delay attendant on separate thickness measurements necessary to detect any edge-to-edge or edge-to-center gauge variations.

In order that the invention may be fully understood, various embodiments will now be described by way of example, with reference to the accompanying drawings, in which.

Figure 1:
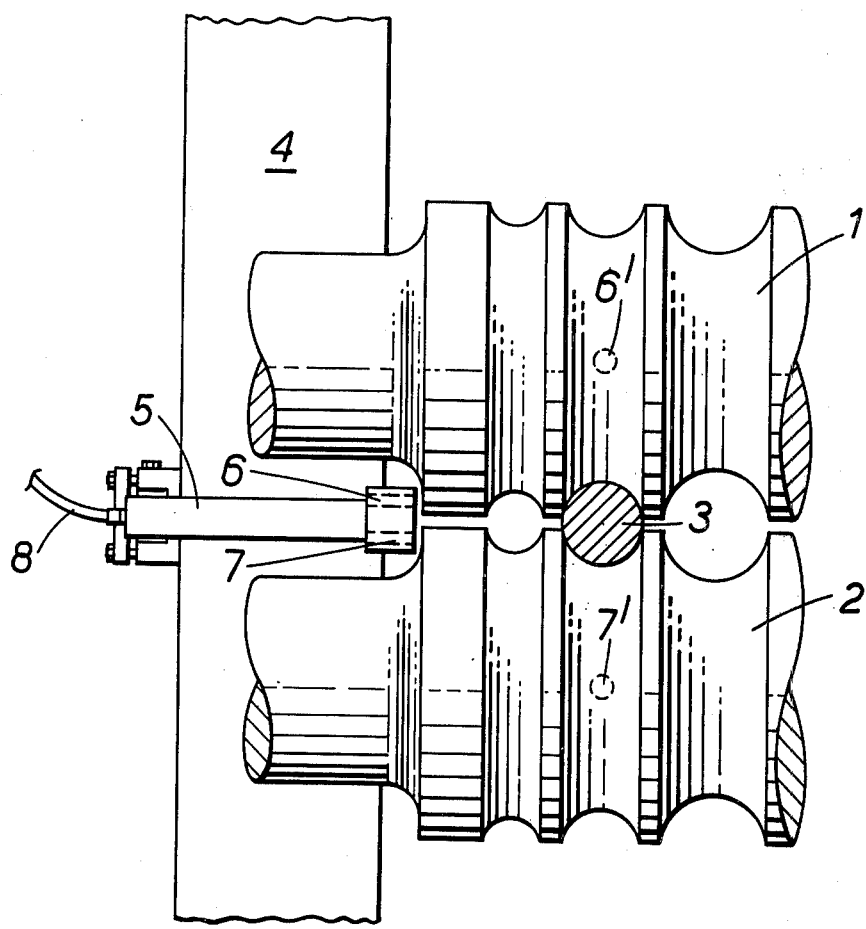
FIG. 1 is a part-sectional elevation of a mill stand for rolling bars showing sensors positioned in the roll housing.

Referring now to FIG. 1 co-operating rolls 1, 2 in a bar mill are shown with a steel bar 3 being rolled. Fixedly mounted in the roll housing 4 is a support structure 5 which carries at its end a pair of eddy-current sensors 6, 7 which lie closely adjacent the end faces on the necks of the rolls or the shoulders (as shown). Each sensor simply comprises a coil wound on a ferrite core which is mounted in a cup-shaped ferrite surround, the coil then being potted-in. The clearance between each sensor and the corresponding roll may be mechanically adjusted either prior to or during rolling to bring the sensor within the designed measuring range.

Outputs from the sensor heads are taken via a lead 8.

With the sensors in the position shown any misalignment of the rolls along their axes, such as would cause non-circular section 'rounds' to be rolled, may be detected.

Figure 2:
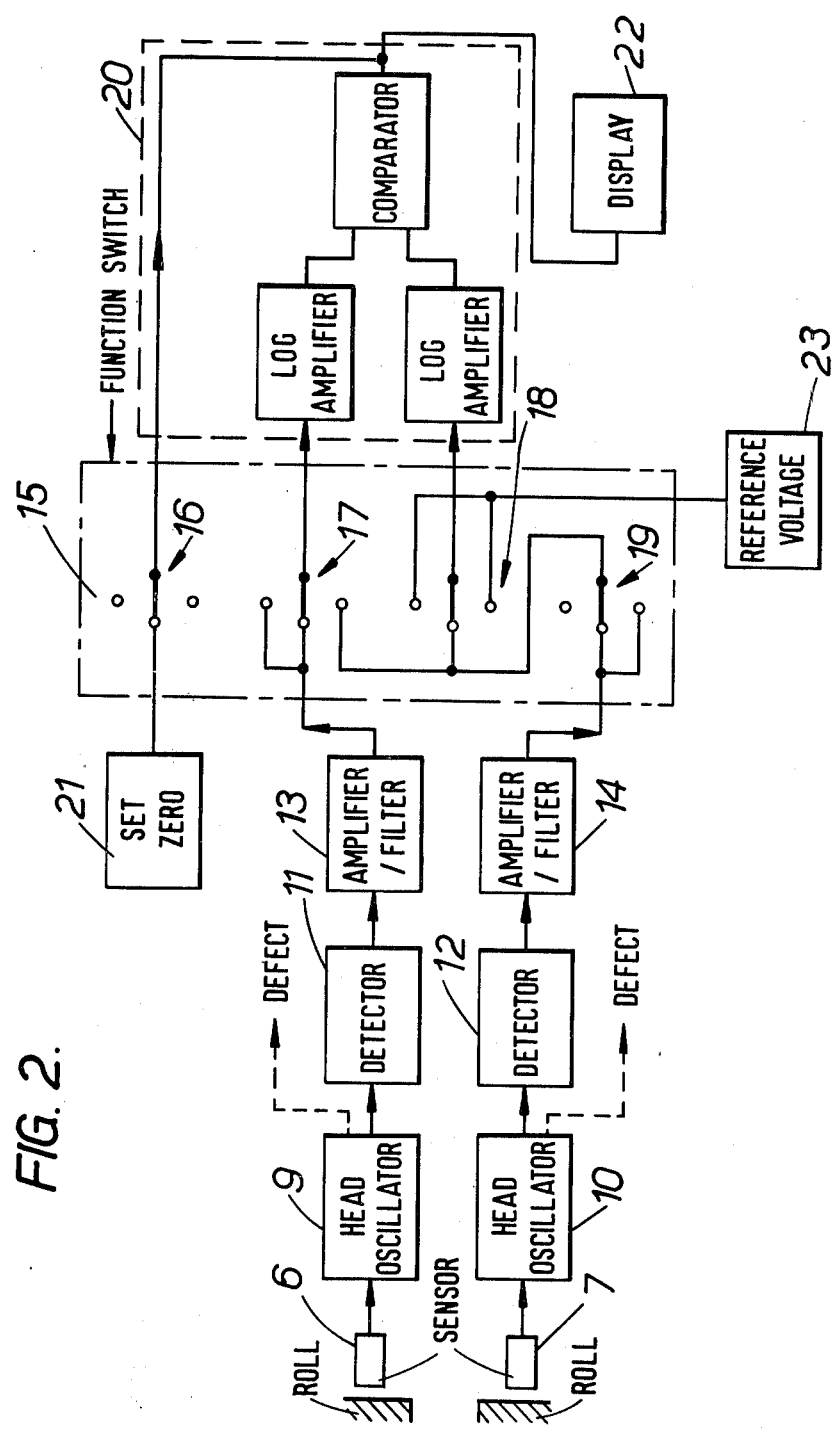
FIG. 2 is a schematic block diagram of the circuit for processing the sensor signals.

More particularly, referring now to FIG. 2 the sensors are separately energised by high frequency constant current oscillators 9 and 10; their modulated outputs are applied to detectors 11, 12 the de-modulated outputs from which (indicative of the sensor roll spacing) are then applied to amplifier/low pass filter circuits 13, 14. These circuit elements may conveniently be of standard form or alternatively they may be the same as those in the amplitude information channel described in our co-pending application referred to above.

These signals are then applied to a function switch 15 the purpose of which is to select any one of three measurements, namely, the absolute distance between each of the sensors and its associated roll, or the difference between these distances, i.e. 'read head *a*', 'read head *b*' and 'read difference'. Ganged switches 16–19 are provided for this.

With the switches in the position shown the outputs from both sensors are applied to a log ratio amplifier 20 together with a 'set zero' signal from unit 21. Basically, this latter unit is a potentiometer which applies to the amplifier 20 a d.c. signal such as to adjust the output from it to zero when the two absolute readings from the sensors 6 and 7 are equal, i.e. when there is no differential in the spacing. Under these conditions 'zero error' is indicated on the display unit 22.

Operationally, this feature is exploited to the extent that when a misalignment error in a rolled bar has been detected, e.g. by micrometer measurement on a trial bar, the appropriate error is set on the display unit by adjustment of the set zero control. For this purpose a facility may be provided by which the display reading may be scaled by some factor dependent on the angle to the roll axis at which the shoulder differences were measured. The rolls are then manually adjusted until this unit reads zero again, and with the rolls in this new position subsequently rolled bars should exhibit no error. Thereafter a watch on any further deviation in the roll position can be kept by using this 'read difference' facility.

With the ganged switches 16–19 in the upper position the log ratio amplifier compares the output from the sensor 6 with a voltage from a reference source 23. An absolute reading of the distance between this sensor and the associated roll is thereby obtained. The same condition for the sensor 7 is read-off when the ganged switches are moved into the lower position.

These absolute readings are of course necessary when initially adjusting the 'set-zero' back-off signal as described above but in addition they may conveniently be employed for measuring roll wear. For example, wear on the individual rolls 1 and 2, may be measured in this fashion by mounting sensors 6', 7' in the positions shown in FIG. 1.

The log ratio amplifier 20 may conveniently be a standard module e.g. Analogue Devices Model No. 756, and basically comprises two log amplifiers which receive the appropriate inputs from the two amplifier/filters 13, 14, respectively, or from either one of these circuits and the reference voltage input, as appropriate. These log amplifiers provide linear voltage outputs from the log inputs which are then compared, the difference signals being applied to the display unit 22.

Figure 3:
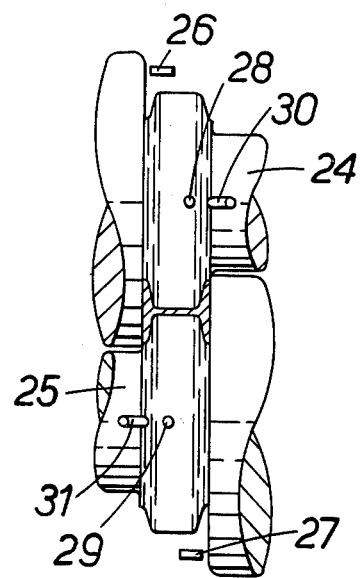
FIG. 3 is a part-sectional elevation of the work rolls in a section mill for rolling beams with sensors mounted for wear detection.

FIG. 3 shows a section mill for rolling beams and the sensors have been sited to measure wear affecting various parts of rolls 24, 25. In this instance various combinations of absolute and difference readings from the three 'sets' of sensors 26, 27; 28, 29 adjacent the working surfaces and 30, 31 adjacent the roll shoulders adjacent the flanks will be displayed by appropriate ganging of individual switches within the function switch itself. Since the sensors 26, 27 will be affected by any axial misalignment between the rolls, this factor may be separately measured by providing additional sensors at the ends of the rolls in a similar manner to the embodiment Figure.

Figure 4:
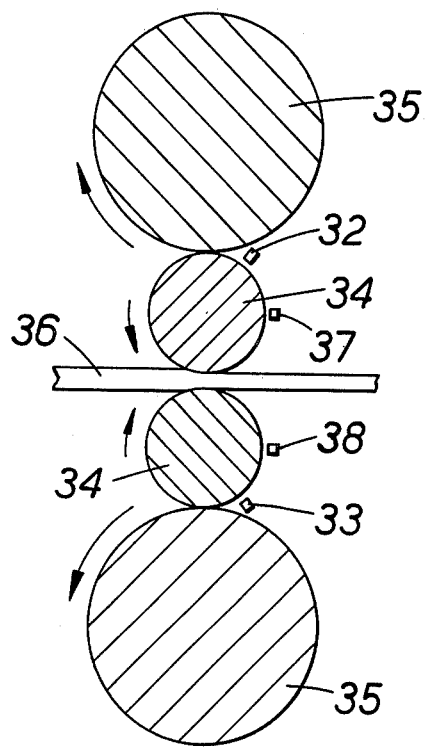
FIG. 4 is a sectional side elevation of a four high plate mill stand with sensors positioned to detect roll bending and roll wear.

FIG. 4 shows a strip or plate mill stand with sensors positioned to detect roll bending in addition to roll wear. In this embodiment a series of sensors 32 and 33 are mounted as closely as possible to the nip between the work rolls 34 and their associated back-up rolls 35. These sensing heads are located adjacent on the rolls 34 in such a manner as to detect bending movement substantially in a plane normal to the direction of travel of the slab 36. A like number of sensors 37, 38 are similarly mounted close to the surface of the appropriate work rolls 34 in planes containing their axes and lying parallel to the direction of travel of the slab.

With this arrangement the sensors 37, 38 measure the appropriate roll wear whereas the sensors 32, 33 measure the appropriate roll wear less the roll bending. An absolute reading of roll bending can thus readily be obtained by measuring differences between these readings with the individual switches in the function switch again ganged appropriately.

The sensor mountings have not been shown but clearly in this embodiment they are very rigid since they extend right across the roll face and must not form part of the normal stress path of the mill.

The facility of the use of eddy-current sensors in measuring distance (or spacing) and wear may conveniently be extended to provide an indication of surface roughness or defects. This characteristic is manifested as a high frequency component in the output signal from the sensor and in this instance the appropriate additional outputs would be taken from the oscillators 9 and 10 (as shown in FIG. 2). The detailed circuitry for this operational concept is not shown but again it may conveniently be of the form shown in our copending patent application referred to, cf. the frequency information channel.

Figure 5:
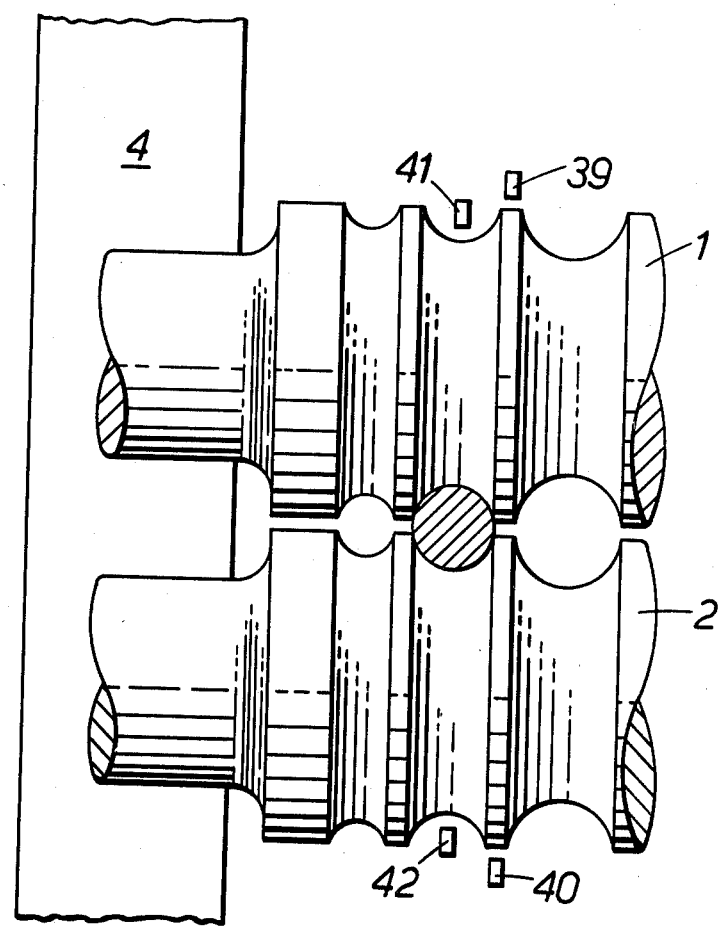
FIG. 5 is a part-sectional elevation of a mill stand similar to FIG. 1 in which provision is made for measuring bar height.

A further embodiment envisaged is that shown in FIG. 5 in which the principle of spacing measurement is used to measure the height of bars, rods, sections or strip being rolled. Knowing the roll diameters and the absolute spacing between sensors 39 and 40, the roll gap may be deduced from the readings given by these sensors, which are situated adjacent a non-wearing part of the roll as close as possible to the pass in use. Sensors 41 and 42 situated adjacent the wearing zone of the pass enable the wear to be deduced since the change in clearance registered by sensors 41 and 42 from the 'original' roll pass dimension for example is a direct measurement of pass wear as rolling progresses;. Thus both the 'loaded' roll gap and the pass wear are summated with the original pass dimension to obtain a reading of the height of the stock being rolled at any instant. Sensors 39 to 42 are mounted on a common framework which does not form part of the mill stress path and incorporate means for adjusting their relative dispositions both in the horizontal and vertical directions so that all may be brought within their measuring range prior to rolling. Further adjustments by known amounts might be made during rolling.

Although this invention has been described with reference to the particular embodiments illustrated, it is to be understood that various modifications may be made without departing from the scope of this invention. For example, the FIG. 1 embodiment shows the sensors mounted adjacent the shoulders on the roll necks; alternatively they could equally well be located adjacent the terminal ends of the rolls where access may be better or adjacent to any collar, coupling or disk fitted on the roll. Further, although circular bars are shown in this Figure rectangular or hexagonal section bars may be rolled, any misalignment here being manifested in different measurements across opposite faces or across the diagonals. Roll bending could also equally well be measured in this embodiment (and in FIG. 3) in the same manner as that shown in FIG. 4.

We claim:

1. A method of monitoring the alignment of a rolling pass defined between cooperating rolls in a mill stand during rolling of a bar, rod or section stock, comprising the steps of:
   fixedly positioning an eddy current sensor in close proximity to an end surface of each of said cooperating rolls,
   energizing said sensors to provide outputs representative of the amount by which said sensors are spaced from the said end surfaces, and
   processing said outputs to indicate changes in the spacing of said rolls along their axes from a reference position defining an aligned pass.

2. A method as recited in claim 1 wherein said rolls have shoulders and the end surfaces of the rolls are the shoulders of said rolls.

3. A method as recited in claim 2 operable in a section mill in which cooperating rolls define the section between roll shoulders and roll working surfaces of said rolls wherein each of said cooperating rolls has a pair of flank working surfaces and a cylindrical working surface therebetween and further comprising the steps of:
   mounting an additional eddy current sensor adjacent one flank working surface and one cylindrical working surface of each of said cooperating rolls, and
   energizing said additional sensors to provide outputs representative of the amount by which said additional sensors are spaced from said flank and cylindrical surfaces and processing the output signals from said additional sensors to provide an indication of roll wear on said flank and cylindrical surfaces.

4. A method of monitoring parameters of cooperating rolls in a mill stand during rolling bar, rod or section stock, comprising the steps of:
   fixedly mounting an eddy current sensor in close proximity to an end surface of each of said cooperating rolls,
   energizing said sensors to provide outputs representative of the amount by which said sensors are spaced from said surfaces,
   processing said outputs to monitor changes in the disposition of said rolls along their axes from a datum position defining a substantially aligned pass,
   fixedly mounting an additional eddy current sensor in close proximity to a working surface of each of said cooperating rolls defining said pass, and
   energizing said additional sensors to provide additional outputs representative of the amount by which said additional sensors are spaced from said working surfaces and processing the additional output signals to provide an indication of roll wear on said working surfaces.

5. Apparatus for monitoring the alignment of a rolling pass defined between cooperating rolls in a mill stand during rolling comprising:
   a plurality of eddy current sensors, each sensor fixedly mounted in proximity to an end surface of one of said cooperating rolls for detecting displacement of said rolls along the axis of said rolls,
   circuit means for energizing the sensors and deriving sensor signals therefrom,
   a reference signal source for providing reference signals,
   switching means for receiving said sensor signals and said reference signals and selecting certain ones of these signals, and
   a processing circuit for processing the signals thus selected and providing an output indicative of the pass alignment.

6. Apparatus according to claim 5, wherein the circuit means comprises:
   a plurality of high frequency oscillators, one oscillator for driving each sensor,
   a corresponding plurality of detectors, one detector responsive to the outputs from the corresponding oscillator, and
   a corresponding plurality of amplifier/low pass filters, one amplifier/filter responsive to the output from the corresponding detector.

7. Apparatus according to claim 6, wherein the processing circuit comprises
   separate log amplifiers each for receiving separate ones of the selected signals and providing linear outputs therefrom.

8. Apparatus according to claim 7, wherein the processing circuit further comprises
   a comparator for comparing the linear outputs from said log amplifiers and
   an output circuit for displaying differences between said linear outputs.

9. Apparatus according to claim 7, wherein the reference signal source comprises
   first means providing a reference signal, said signal having an adjustable magnitude to provide a true reading of the absolute distance between a selected sensor and its associated roll, and
   second means providing a set zero level for zeroing any difference between the absolute readings from the sensors.

10. Apparatus according to claim 6, comprising
    measuring means for separately measuring a high frequency component of the sensor signals thereby providing an indication of roll surface roughness.

11. Apparatus for monitoring the alignment of a rolling pass defined between cooperating rolls in a mill stand during rolling comprising:
    a. a plurality of eddy current sensors, each sensor fixedly mounted in proximity to an end surface of one of said cooperating rolls for detecting roll displacement along the axis of said rolls,
    b. circuit means for energizing the sensors and deriving sensor signals therefrom,
    c. a reference signal source for providing reference signals,
    d. switching means for receiving said sensor signals and said reference signals and selecting certain ones of these signals, said reference signal source comprising:
       i. first means providing a reference signal, said signal having an adjustable magnitude to provide a true reading of the absolute distance between a selected sensor and its associated roll, and
       ii. second means providing a set zero level for zeroing any difference between the absolute readings from the sensors,
    e. a comparator for comparing the selected signals representative of the pass alignment, and
    f. an output circuit for displaying the comparator output.

* * * * *